US008515372B2

(12) United States Patent
Kaczman et al.

(10) Patent No.: US 8,515,372 B2
(45) Date of Patent: Aug. 20, 2013

(54) RECEIVER CONFIGURABLE IN A PLURALITY OF MODES

(75) Inventors: Daniel L. Kaczman, Gurnee, IL (US); Manish N. Shah, Vernon Hills, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 1512 days.

(21) Appl. No.: 12/079,106

(22) Filed: Mar. 24, 2008

(65) Prior Publication Data

US 2009/0239489 A1    Sep. 24, 2009

(51) Int. Cl.
*H04B 17/00* (2006.01)

(52) U.S. Cl.
USPC ............... 455/226.4; 455/234.2; 455/323; 455/334; 375/345

(58) Field of Classification Search
USPC .......... 455/226.1–226.4, 232.1, 234.1, 234.2, 455/323, 334; 375/345
See application file for complete search history.

(56) References Cited

U.S. PATENT DOCUMENTS

| | | | |
|---|---|---|---|
| 5,822,699 A * | 10/1998 | Kotzin et al. ............. | 455/447 |
| 5,940,454 A * | 8/1999 | McNicol et al. ........... | 375/347 |
| 6,985,714 B2 * | 1/2006 | Akiyama et al. ........... | 455/402 |
| 7,130,359 B2 * | 10/2006 | Rahman ................... | 375/316 |
| 7,688,880 B2 * | 3/2010 | Haub et al. ................ | 375/148 |
| 2007/0287402 A1 | 12/2007 | Feng et al. | |
| 2008/0057899 A1 * | 3/2008 | Montemayor et al. ....... | 455/255 |

* cited by examiner

*Primary Examiner* — Nhan Le

(57) ABSTRACT

Methods and corresponding systems for receiving a radio frequency signal include a receiver capable of switching operating modes and operable to receive the radio frequency signal in any of the operating modes. A metric monitor is coupled to the receiver and operable to provide a metric. A controller is responsive to the metric and operable to switch the receiver between the operating modes. The operating modes can include a zero intermediate frequency (ZIF) mode and a very low intermediate frequency (VLIF) mode. The metric can include a received signal strength indicator (RSSI) and an adjacent channel indicator. The receiver can be configured to operate in the ZIF mode in response to the RSSI value satisfying a threshold and configured to operate in the VLIF mode in response to the RSSI value failing to satisfy the threshold.

12 Claims, 2 Drawing Sheets

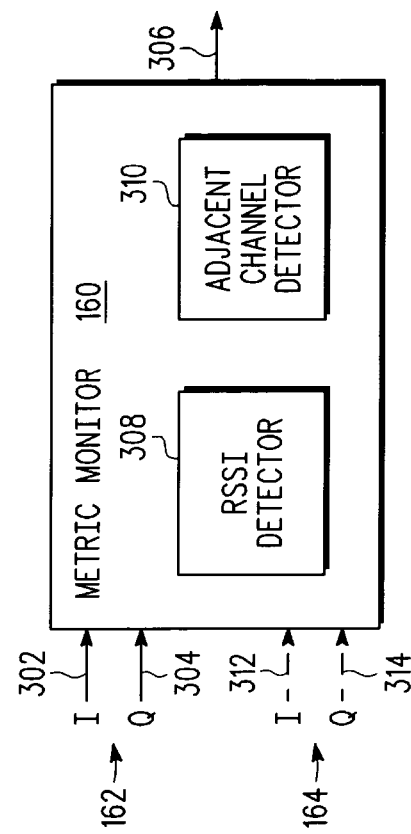
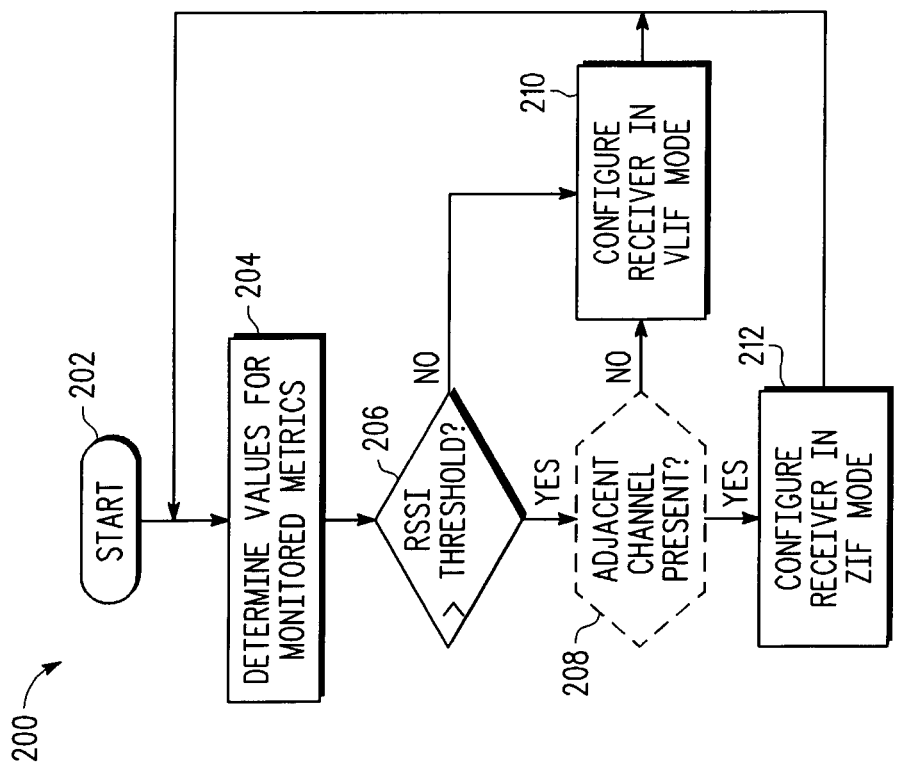
FIG. 3
FIG. 2

RECEIVER CONFIGURABLE IN A PLURALITY OF MODES

BACKGROUND

1. Field

This disclosure relates generally to a receiver in a communications system, and more specifically to a receiver adapted to switch between a plurality of modes in response to monitored metrics within the receiver.

2. Related Art

Receivers in communication systems used to receive radio frequency signals can use many ways to demodulate a selected signal to recover a baseband signal or data. For example, some receivers use a superheterodyne architecture or scheme to remove a carrier frequency from a received signal to produce a baseband signal. Such a superheterodyne architecture can use one or more frequency shifts (e.g. heterodyning processes) to produce one or more intermediate signals with successively lower intermediate frequencies until finally producing a baseband signal. In one architecture, a receiver can use a very low intermediate frequency (VLIF) where a received signal is shifted down to a very low intermediate frequency, which can be subsequently down converted to a baseband signal. In yet another type of receiver, the received frequency can be down converted to baseband in a single mixing operation. This type of receiver is known as a zero intermediate frequency (ZIF) receiver or a direct conversion receiver.

By using a low IF architecture, the advantages of a superheterodyne structure can be combined with the advantages of direct conversion architecture. For example, IF selectivity can be realized using low frequency analog and digital filtering. In the VLIF architecture, the fact that the local oscillator signal is not the same frequency as the desired, or on-channel signal, minimizes DC offset and 1/f noise problems inherent in the direct conversion architecture. However, mixer imbalance issues can limit image rejection in a VLIF receiver, which can reduce the adjacent channel rejection performance of the VLIF receiver. To compensate for poor adjacent channel rejection performance, some VLIF receivers may use costly calibration circuits and procedures.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a flowchart of one or more processes that can be implemented in a receiver in accordance with one or more embodiments; and FIG. 3 is a more detailed schematic diagram of the metric monitor shown in receiver 100 of FIG. 1 in accordance with one or more embodiments.

DETAILED DESCRIPTION

Figure 1:
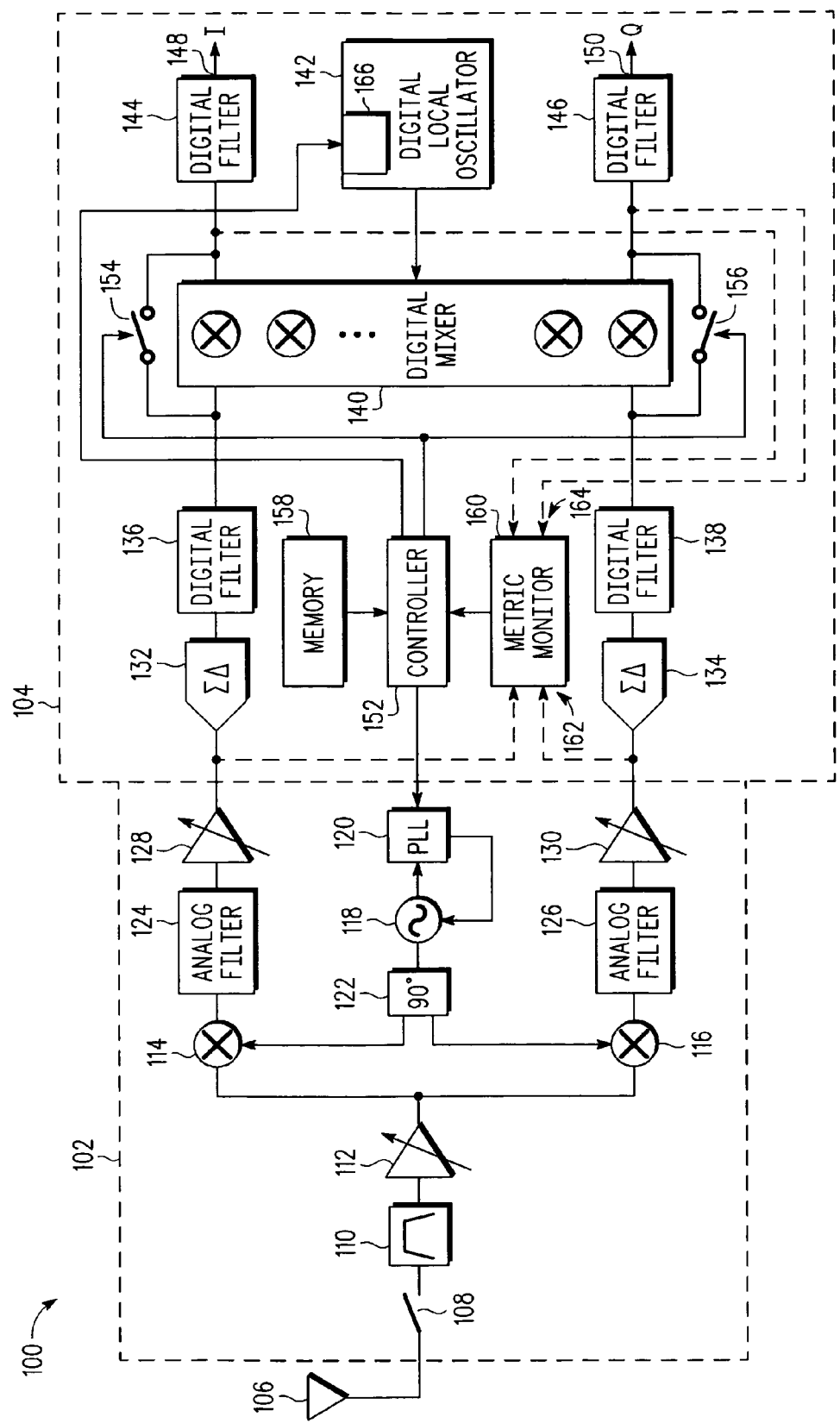
FIG. 1 is a high-level schematic diagram of a receiver for receiving a selected signal in a communications system in accordance with one or more embodiments.

Referring to FIG. 1, a high-level schematic diagram of a receiver 100 in accordance with one or more embodiments will be briefly discussed and described. As shown, receiver 100 can include front end 102 and back end 104, wherein front end 102 can generally receive and process radio frequency analog signals, and output analog intermediate frequency signals. Back end 104 can generally digitally process signals produced in the analog front end, and output digital baseband signals.

Front end 102 can receive radio frequency signals from antenna 106, or another radio frequency signal source, such as a coaxial cable system, or the like. Antenna 106 can be coupled to switch 108, which can be used to select a frequency band, when, for example, receiver 100 can receive radio frequency signals from multiple frequency bands. Switch 108 can also be used as a transmit-receive (T-R) switch for a time-division multiplexing (TDM) system, such as the Global System for Mobile communications (GSM) system (which is documented in a specification published by the European Telecommunications Standards Institute (ETSI)). Switch 108 can be implemented in one embodiment with a solid-state electronic switch.

While one terminal of switch 108 can be coupled to antenna 106, another terminal can be coupled to an input of bandpass filter 110. Bandpass filter 110 can be used to filter, or attenuate, radio frequency signals that are outside of the desired band of signals (e.g., the desired group of channels or carrier frequencies) that can be processed by receiver 100. An output of bandpass filter 110 can be coupled to an input of low noise amplifier (LNA) 112, which can be used to boost the radio frequency signal for further processing.

An output of LNA 112 can be input into a pair of mixers 114 and 116, wherein the mixers are used to process and output the I and Q, in-phase and quadrature-phase signal components, respectively. Mixers 114 and 116 can be implemented with an active mixer topology (e.g., a Gilbert cell) or a passive mixer topology (e.g., a switching mixer). Mixers 114 and 116 together can be referred to as a first mixer, wherein such a first mixer is a complex mixer, wherein the I and Q inputs can together be referred to in the singular (e.g., a first mixer having a signal input).

Local oscillator signals input into mixers 114 and 116 can be produced by oscillator 118, in conjunction with phase locked loop (PLL) 120 and quadrature generator 122. Phase locked loop 120 can be used to set the frequency for, and provide a phase reference for, oscillator 118. Quadrature generator 122 can be used to produce in phase and quadrature phase local oscillator (LO) signals that can be used by mixers 114 and 116 to multiply the radio frequency signal from LNA 112. The multiplication performed by mixers 114 and 116 shifts, or converts, or heterodynes, the frequency of the output of LNA 112 to a lower frequency, or intermediate frequency, which can be a "low," or "very low," intermediate frequency, e.g., 100 KHz-300 KHz, or a "zero" intermediate frequency, depending upon a selected frequency for PLL 120, and/or the desired operating mode of receiver 100. Note that the outputs of quadrature generator 122 (e.g., the in phase and quadrature phase local oscillator components) can be collectively referred to as a first local oscillator output, which can be coupled to the first local oscillator input of the first mixer.

Outputs of mixers 114 and 116 can be input into analog filters 124 and 126, respectively. Analog filters 124 and 126 can be implemented with a passive component filter (e.g., a filter that uses resistive (R) and capacitive (C) components to realize a first order filter), or with a biquad filter (e.g., a filter that uses active components to realize a higher order filter). The purpose of analog filters 124 and 126 is to attenuate interfering signals and noise, such as an adjacent channel or alternate channel signals outside the bandwidth of the filter and to prevent anti-aliasing in analog to digital converters 132, 134. In one embodiment a bandwidth on the order of 1 MHz is used for the analog filter.

Outputs of analog filters 124 and 126 can be input into amplifiers 128 and 130, respectively. Amplifier 128 can boost the signal for analog to digital conversion and provide variable gain to increase the dynamic range of the receiver.

In the embodiment shown in FIG. 1, outputs of amplifiers 128 and 130 can be considered outputs of receiver front end 102 and inputs to receiver back end 104. As shown in back end 104, processing of the I and Q signal paths continues as the outputs of amplifiers 128 and 130 are input into inputs of analog-to-digital (A/D) converters 132 and 134, respectively. In one embodiment, A/D converters 132 and 134 can be implemented with known Sigma-Delta type converters (i.e., Σ-ADC). Output from each of the A/D converters 132 and 134 is a stream of digital data, or symbols, corresponding to the analog waveform output by amplifiers 128 and 130.

The digital output of A/D converters 132 and 134 can be input into digital filters 136 and 138, respectively, in order to further process the I and Q quadrature signals. Digital filters 136 and 138 can be used to realize additional selectivity to reduce the effects of close-in, interfering adjacent channel signals. As is known, the primary selectivity for the receiver is provided by digital filters 136, 138. In one embodiment, these filters have a bandwidth on the order of 200 KHz.

Outputs of digital filters 136 and 138 can be selectively input into digital mixer 140, which can be used in conjunction with digital local oscillator 142 to digitally shift the frequency of a very low intermediate frequency (VLIF) signal to produce a digital baseband signal, and to remove an image signal, using known digital mixer techniques. Note that digital mixer 140 can be referred to as a second mixer for performing a second mixer function using a signal from a second local oscillator.

The difficulty in rejecting the image signal depends upon an amplitude and phase imbalance between the I and Q signals, where a lower imbalance produces a greater image rejection. For example, a second generation (i.e., 2G) GSM receiver with an IF frequency of 130 KHz requires an image rejection of 45 dB to meet the adjacent channel (or alternate channel) selectivity specification. This specification translates into very stringent amplitude and phase imbalance requirements for the I and Q signals, i.e., stringent imbalance requirements for the first mixer and digital mixers. Maintaining a low amplitude and phase imbalance is difficult in a VLIF receiver, especially over the specified temperature range. To maintain a low amplitude and phase imbalance, receivers can use calibration techniques and circuitry, which can require additional time, power, integrated circuit die area, software, and complexity.

Outputs of digital mixer 140 can be coupled to inputs of digital filters 144 and 146, respectively, to perform further filtering of the I and Q quadrature signals.

Digital filter 144 can include output 148 for outputting digital data from the I signal path of receiver 100. Similarly, digital filter 146 can include output 150 for outputting digital data from the Q signal path.

In order to improve the performance of receiver 100, controller 152 can selectively and automatically configure receiver 100 to operate in two or more modes to receive a selected RF channel. In one embodiment, these multiple modes can include modes using different intermediate frequencies to receive information on the same selected RF channel or the same selected signal, wherein one of the intermediate frequencies can include a zero intermediate frequency. For example, receiver 100 can be configured to operate in a very low intermediate frequency (VLIF) mode, and in a zero intermediate frequency (ZIF) mode.

To change the configuration of receiver 100, controller 152 can send signals to front end 102 and to back end 104 to change the operation of each in response to a performance metric in the receiver. For example, to operate in the ZIF mode, controller 152 can configure front end 102 so that a front end local oscillator (e.g., local oscillator 118 in cooperation with phase locked loop 120) is set to operate at the carrier frequency of a desired radio frequency signal received at antenna 106, and set back end 104 to bypass, or bypass the function of, digital mixer 140. With regard to operating in the VLIF mode, controller 152 can configure the front end local oscillator (e.g., LO 118 and PLL 120) to operate at a frequency that produces an analog signal having a very low intermediate frequency at the output of mixers 114 and 116, and configure back end 104 to enable the operation of digital mixer 140 with an LO signal of an appropriate frequency from digital local oscillator 142.

In one embodiment of a ZIF mode operation, bypassing digital mixer 140 can be implemented by closing bypass switches 154 and 156 to provide a signal path around digital mixer 140 (i.e., to provide a switched second mixer bypass signal path). In another embodiment, bypassing digital mixer 140 can be implemented by bypassing the function of digital mixer 140 by setting digital local oscillator 142 to a zero frequency to multiply the signals input to digital mixer 140 by a constant (e.g., the LO outputs all zeros). Digital LO 142 can be set to a zero frequency output by sending a signal from controller 152 to zero frequency function 166, which function can contain circuits, or software code, or both (depending upon whether digital LO 142 is implemented with logic circuits, or software, or both) to set LO 142 to a frequency of zero. When digital LO 142 is set to zero frequency, the I and Q signals can be passed through the digital mixer without modification. In yet another embodiment, bypassing the function of digital mixer 140 can be implemented with software code that bypasses, or jumps around, the code or instructions written to perform the function of digital mixer 140. Bypassing, or not bypassing, digital mixer 140 can also be referred to as disabling or enabling digital mixer 140, respectively.

Memory 158 can be coupled to controller 152 for storing various data variables, data regarding historical receiver operation, data constants, data tables, code or microcode for implementing functions and/or algorithms, and the like. For example, memory 158 can be used to store threshold values for one or more metrics of receiver 100 that can be used in selecting a mode of operation of receiver 100. Memory 158 can be used to store microcode for executing an algorithm, or method that can be used to select and configure a mode of operation of receiver 100.

Metric monitor 160 can be coupled to controller 152 for determining and providing data corresponding to one or more metrics that can be used by controller 152 to select a mode of operation of receiver 100. Metric monitor 160 can input data from various parts of receiver 100, as illustrated in FIG. 1 by dashed lines showing signal inputs at 162 and 164. As shown at inputs 162, analog I and Q signals from the outputs of amplifiers 128 and 130 can be input into metric monitor 160. At inputs 164, digital I and Q signals can be input into metric monitor 160.

With reference to FIG. 3, there is depicted a more detailed diagram of metric monitor 160 in accordance with one or more embodiments. As shown, metric monitor 160 can receive one or more signals, or sets of signals (e.g., an I and Q signal set at inputs 302 and 304, and possibly and additional I and Q signal set at inputs 312 and 314). Results of various measurements and calculations within metric monitor 160 can be reported to controller 152 through output 306.

In various embodiments, metric monitor 160 can monitor one metric, or more than one metric, wherein the metrics can be based upon analog inputs, digital inputs, or both. Thus, in the example embodiment shown in FIG. 1, metric monitor 160 has inputs (e.g., inputs 302 and 304 in FIG. 3) that receive analog signals from an analog portion of receiver 100 to monitor a first metric, and additional inputs (e.g., inputs 312 and 314) for receiving digital inputs from a digital portion of the receiver to monitor a second metric. Thus, receiver metrics can be measured and/or calculated values that correspond to a characteristic of receiver operation or performance. In another embodiment, a receiver metric can be based upon a history of a metric, or upon statistical or other processing of a history of a metric.

As shown in FIG. 3, metric monitor 160 can include received signal strength indication (RSSI) detector 308 and adjacent channel detector 310. RSSI detector 308, in one embodiment, can use digital signals (e.g., inputs 164 in FIG. 1) input at 302 and 304 to monitor an RSSI metric, which is a measurement of the power present in a received signal, i.e., the on channel or desired signal or selected signal.

In an embodiment of adjacent channel detector 310, analog signals (e.g., inputs 162 in FIG. 1) input at 302 and 304 (or alternatively at 312 and 314) can be used to determine the presence of an adjacent channel transmission. Alternatively, the outputs from ADC 132, 134 can be used as the inputs 302, 304 to the adjacent channel detector. Determining the presence of an adjacent channel transmission can include determining the presence of a transmission (or energy) on an immediately adjacent channel (i.e., a contiguous channel), or determining the presence of a transmission on an alternate channel (a noncontiguous, nearby channel). In yet another embodiment, adjacent channel detector 310 can be used to detect a transmission or energy on any other channel (i.e., off-channel energy) in the band that can reduce the performance of receiver 100. The channel selected for monitoring in adjacent channel detector 310 can vary depending upon the intermediate frequency selected in the VLIF mode. For example, when an intermediate frequency of 130 kHz is selected, an RF transmission on a channel 400 kHz away can impact receiver performance. In an embodiment that monitors an adjacent channel metric, receiver 100 performance can be increased by operating in a ZIF mode when an adjacent channel transmission is present.

Adjacent channel detector 310 can use a wideband detector to detect adjacent channel transmissions during an idle time slot. In some embodiments, adjacent channel detector 310 can use discrete Fourier transform techniques to quantify transmitted or detected energy in various portions of the radio frequency band, wherein energy is quantified in "bins." When this technique is used, adjacent channel detector 310 can check for interfering out-of-channel energy by examining bin data corresponding to frequencies that can interfere with the selected signal frequency in receiver 100.

In another embodiment that monitors an RSSI metric as an input to control the receiver mode, receiver performance can be increased by configuring receiver 100 to operate in the ZIF mode when the RSSI value is above a threshold, or otherwise satisfies a threshold. The threshold, in one embodiment, can be set at −90 dBm. In some receivers, the ZIF mode can have an advantage over the VLIF mode because it avoids the difficulties in meeting the stringent image rejection requirement in the GSM specification. In operation, an RSSI level can be calculated in metric monitor 160 and reported to controller 152 at the beginning of a received slot using a GSM Receiver sequence (GRS) command that provides information about setting the frequency of the LO.

In an embodiment of receiver 100 that uses frequency hopping, data provided by metric monitor 160 can be stored as historical data in memory 158, where such data can be used to calculate or produce a metric based upon statistical analysis or data history. Such metrics based upon historical data can be used to predict an adjacent channel transmission metric based on prior metrics indicating which channel had an adjacent channel present and knowledge of the hopping sequence. Thus, an adjacent channel metric can be predicted for the next time that channel is selected again.

Referring now to FIG. 2, there is depicted a high-level flowchart of one or more processes that can be implemented in receiver 100 in accordance with one or more embodiments. As shown, the process begins at 202, and thereafter continues at 204 wherein the process determines values for monitored metrics. Such monitored metrics can be measured and/or calculated values that correspond to a characteristic of receiver operation or performance. In one embodiment, RSSI can be a monitored metric, wherein the RSSI can be produced in RSSI detector 308 (see FIG. 3) in metric monitor 160 (see FIG. 1). The RSSI metric can be represented as a power level measured in dBm, which is passed to controller 152. In another embodiment, the presence of an adjacent channel transmission can be a monitored metric, wherein the presence or absence of the adjacent channel transmission can be represented as a Boolean value. The presence or absence of an adjacent channel can be determined by adjacent channel detector 310 in metric monitor 160 using a wideband detector during an idle time slot. In embodiments that monitor more than one metric, both RSSI and the presence of an adjacent channel transmission can be monitored metrics. In embodiments that use frequency hopping in receiver 100, metrics can be based upon a history of previously measured metrics.

Next, the process determines whether the RSSI is greater than, or otherwise satisfies, an RSSI threshold (e.g., −90 dBm), as illustrated at 206. If RSSI is not greater than the RSSI threshold, the process configures the receiver to operate in the VLIF mode, as depicted at 210, thereby avoiding problems associated with ZIF operating modes at low signal level. Receiver 100 can be configured to operate in the VLIF mode by setting the LO of front end 102 (e.g., the first LO, which includes oscillator 118 and PLL 120) to operate at a frequency that is slightly lower than the carrier frequency by a difference equal to the intermediate frequency. In one embodiment the intermediate frequency can be 130 kHz. Additionally, digital local oscillator 142 (e.g., the second LO) can be set to operate at the intermediate frequency (e.g., 130 kHz in this example) so that the function of digital mixer 140 is enabled, or not bypassed (i.e., bypass switches 154 and 156 are set open).

In an embodiment that monitors only one metric (e.g., RSSI) and if the RSSI is greater than the RSSI threshold at 206, the process can skip step 208 and configure the receiver to operate in the ZIF mode, as illustrated at 212. Receiver 100 can be configured to operate in the ZIF mode by setting the LO of front end 102 (e.g., the first LO) equal to the carrier frequency, and by setting digital local oscillator 142 (e.g., the second LO) to a zero frequency (e.g., a constant zero output). Digital LO 142 can be set to a zero frequency output by sending a signal from controller 152 to zero frequency function 166, which function can contain circuits or software code (depending upon whether digital LO 142 is implemented with logic circuits, or software, or both) to set LO 142 to a frequency of zero. By setting digital LO 142 to a zero frequency, the function of digital mixer 140 is disabled, or bypassed, because the I and Q signals are passed through digital mixer 140 without modification. Alternatively, digital mixer 140 can be bypassed by closing bypass switches 154 and 156 to provide an I and Q signal path around the function of digital mixer 140.

In another embodiment that monitors two metrics, following the comparison at 206 the process can determine whether an adjacent channel transmission is present (e.g., determine whether a blocker signal level exceeds a blocker threshold), as depicted with dashed lines at 208. If the process determines that an adjacent channel transmission is not present, the process can configure the receiver to operate in the VLIF mode, as indicated by the "no" branch from 208 to 210. The process of configuring receiver 100 to operate in the VLIF mode is described above with reference to step 210.

Alternatively, if the process determines that an adjacent channel transmission is present at 208, the process can configure the receiver to operate in the ZIF mode, as shown by the "yes" branch from 208 to 212. The process of configuring receiver 100 to operate in the ZIF mode is described above with reference to step 212.

In one embodiment, a mode of operation of receiver 100 can be determined according to the conditions and required performance values contained in Table 1. In table 1, column 1 indicates the frequency proximity of a blocker signal (e.g., a frequency proximity to the desired channel that can be examined by adjacent channel detector 310), column 2 indicates the blocker signal power level; column 3 indicates the desired signal level of the output of receiver 100 at the conditions set forth in columns 1 and 2. Column 4 can indicate the receiver mode that can be used to achieve the desired signal level performance shown in column 3.

TABLE 1

| Blocker | Blocker Level (dBm) | Desired Signal Level (dBm) | Receiver Mode |
|---|---|---|---|
| Sensitivity | — | −102 | VLIF |
| +/−200 KHz | −73 | −82 | ZIF |
| +/−400 KHz | −41 | −82 | ZIF |
| +/−1.6 MHz | −33 | −99 | VLIF |
| +/−3 MHz | −23 | −99 | VLIF |
| +/−3 MHz 8 psk | −26 | −99 | VLIF |
| +/−20 MHz | 0 | −99 | VLIF |

As shown in FIG. 2, after the operating mode of receiver 100 is configured, the process can iteratively return to 204 wherein the values for monitored metrics can be once again determined. In one embodiment, the values for monitored metrics are determined at the beginning of a receive time slot in order to properly configure the receiver for receiving data in the next time slot. Thus, the process shown in FIG. 2 can be iteratively repeated during operation of the receiver in order to automatically improve receiver operation by selecting one of a plurality of modes of operation to receive a selected RF signal.

Although the invention is described herein with reference to specific embodiments, various modifications and changes can be made without departing from the scope of the present invention as set forth in the claims below. For example, while the techniques and apparatus for automatically selecting a receiver operation mode may vary widely, one or more embodiments can be used in a wireless telecommunications system, or a cable system for distributing RF signals, or the like. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or an essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A receiver for receiving a radio frequency signal, the receiver comprising:
a receiver capable of switching operating modes and operable to receive the radio frequency signal in any of the operating modes;
a metric monitor coupled to the receiver and operable to provide a metric corresponding to the radio frequency signal; and
a controller responsive to the metric and operable to switch between the operating modes.

2. The receiver according to claim 1 wherein the receiver capable of switching operating modes further comprises a receiver capable of switching, responsive to the metric, between operating in a zero intermediate frequency (ZIF) mode and a very low intermediate frequency (VLIF) mode to receive the radio frequency signal in, respectively, the ZIF mode or the VLIF mode.

3. The receiver according to claim 2 wherein the controller further comprises a controller adapted to switch to the ZIF mode in response to the metric monitor producing a receive signal strength indicator (RSSI) that exceeds an RSSI threshold, and adapted to switch to the VLIF mode in response to the metric monitor producing the RSSI that is less than the RSSI threshold.

4. The receiver according to claim 1 wherein the metric monitor further comprises an RSSI monitor for providing an RSSI.

5. The receiver according to claim 1 wherein the metric monitor further comprises an adjacent channel presence monitor for providing an adjacent channel indicator for indicating the presence of an adjacent channel transmission.

6. A method in a receiver for receiving a selected signal in a communication system using a plurality of modes comprising:
determining a monitored metric corresponding to the selected signal in the receiver;
comparing the monitored metric to a threshold; and
in response to the monitored metric satisfying the threshold, configuring the receiver to operate in a first mode to receive the selected signal; and
in response to the comparing the monitored metric not satisfying the threshold, configuring the receiver to operate in a second mode to receive the selected signal.

7. The method in a receiver for receiving a selected signal according to claim 6 wherein the configuring the receiver to operate in the first mode further comprises configuring the receiver to operate in a zero intermediate frequency (ZIF) mode.

8. The method in a receiver for receiving a selected signal according to claim 7 wherein the configuring the receiver to operate in the ZIF further comprises configuring the receiver to operate in the ZIF mode in response to a received signal strength indicator (RSSI) value exceeding an RSSI threshold.

9. The method in a receiver for receiving a selected signal according to claim 7 wherein the receiver has a front end having a first local oscillator coupled to a first mixer and a back end having a second mixer coupled to a second local oscillator, and wherein the configuring the receiver to operate in the ZIF mode further comprises:

configuring the first local oscillator to operate at a carrier frequency of the selected signal; and configuring the second local oscillator to operate at a zero frequency.

10. The method in a receiver for receiving a selected signal according to claim 6 wherein the configuring the receiver to operate in the second mode further comprises configuring the receiver to operate in a very low intermediate frequency (VLIF) mode.

11. The method in a receiver for receiving a selected signal according to claim 10 wherein the configuring the receiver to operate in the VLIF mode further comprises configuring the receiver to operate in the VLIF mode in response to an RSSI value being below an RSSI threshold.

12. The method in a receiver for receiving a selected signal according to claim 10 wherein the receiver has a front end having a first local oscillator coupled to a first mixer and a back end having a second mixer coupled to a second local oscillator, and wherein the configuring the receiver to operate in the VLIF mode further comprises:

configuring the first local oscillator to operate at a frequency equal to the carrier frequency of the selected signal minus an intermediate frequency; and configuring the second local oscillator to operate at the intermediate frequency.

* * * * *